United States Patent [19]

Zehler et al.

[11] Patent Number: 5,021,179

[45] Date of Patent: Jun. 4, 1991

[54] LUBRICATION FOR REFRIGERANT HEAT TRANSFER FLUIDS

[75] Inventors: Eugene R. Zehler, West Chester; Nicholas E. Schnur, Cincinnati, both of Ohio

[73] Assignee: Henkel Corporation, Ambler, Pa.

[21] Appl. No.: 551,979

[22] Filed: Jul. 12, 1990

[51] Int. Cl.$^5$ .......................................... C10M 129/78
[52] U.S. Cl. .................... 252/54.6; 252/56 S; 252/68
[58] Field of Search ...................... 252/52 A, 54, 54.6, 252/56 S, 68

[56] References Cited

U.S. PATENT DOCUMENTS

| | | | |
|---|---|---|---|
| 2,852,470 | 9/1958 | Henne et al. | 252/68 |
| 2,926,139 | 2/1960 | Mott et al. | 252/68 |
| 3,560,387 | 2/1971 | Schritt | 252/56 S |
| 3,562,300 | 2/1971 | Chao et al. | 252/56 S |
| 3,878,112 | 4/1975 | Luck | 252/68 |
| 4,755,316 | 7/1988 | Magid et al. | |
| 4,826,633 | 5/1989 | Carr et al. | 252/56 S |
| 4,851,144 | 7/1989 | McGraw et al. | |

FOREIGN PATENT DOCUMENTS 2216541 11/1989 United Kingdom.

OTHER PUBLICATIONS

Short, Glenn D., "Synthetic Lubricants and Their Refrigerant Applications", 44th Annual Meeting of the Society of Tribologists and Lubrication Engineers, Atlanta, GA, May 1–4, 1989, pp. 1–9.

*Primary Examiner*—Jacqueline V. Howard
*Attorney, Agent, or Firm*—Ernest G. Szoke; Wayne C. Jaeschke; Novell E. Wisdom, Jr.

[57] ABSTRACT

Esters and mixtures of esters of polyhydric alcohols, e.g., of pentaerythritol, in which at least 22 number percent of the acyl groups in the esters are either branched or contain no more than six carbon atoms, are effective lubricants and/or lubricant base stocks for chlorine-free fluorocarbon refrigerant heat transfer fluids, particularly for chlorine-free heat transfer fluids such as Refrigerant 134a (1,1,1,2-tetrafluoroethane).

20 Claims, No Drawings

LUBRICATION FOR REFRIGERANT HEAT TRANSFER FLUIDS

FIELD OF THE INVENTION

This invention relates to lubricants, lubricant base stocks, refrigerant working fluids including lubricants along with primary heat transfer fluids, and methods for using these materials. The lubricants and lubricant base stocks are particularly suitable for use with substantially chlorine-free, fluoro-group-containing organic refrigerating heat transfer fluids such as tetrafluoroethanes.

STATEMENT OF RELATED ART

Chlorine-free heat transfer fluids are desirable for use in refrigerant systems, because their escape into the atmosphere causes less damage to the environment than the currently most commonly used chlorofluorocarbon heat transfer fluids such as trichlorofluoromethane and dichlorodifluoromethane. The widespread commercial use of chlorine-free refrigerant heat transfer fluids has been hindered, however, by the lack of commercially adequate lubricants. This is particularly true for one of the most desirable working fluids, 1,1,1,2-tetrafluoroethane, commonly known in the art as "Refrigerant 134a". Other isomers of tetrafluoroethane are also desirable working fluids.

The general requirements and desiderata for lubricants for refrigerant working fluids are well known in the art and have been recently reviewed by Glenn Short, "Synthetic Lubricants and Their Refrigerant Applications", presented at the 44th Annual Meeting of the Society of Tribologists and Lubrication Engineers held May 1-4, 1989. This entire paper, with the exception of any part that may be inconsistent with any explicit statement herein, is hereby incorporated herein by reference.

U.S. Pat. No. 4,851,144 of July 25, 1989 to McGraw et al. teaches combinations of polyether glycols (also denoted as polyether polyols) and esters of polyhydric alcohols as effective lubricants for hydrofluorocarbon and hydrochlorofluorocarbon based working fluids. The preferred ester component is a mixture of esters formed by reacting pentaerythritol with a mixture of alkanoic acids having 7-9 carbon atoms to form tetraesters. This reference teaches that esters in the absence of polyether glycols are inadequate lubricants.

U.S. Pat. No. 4,755,316 of July 5, 1988 to Magid et al. teaches that polyether glycols alone are adequate lubricants for tetrafluoroethane working fluids. Similar teachings by Sasaki et al., Kaimai et al., and Allied-Signal, Inc. are summarized in *Chemical Abstracts*, Vol. 112, items 23462x, 80832s-80834u, 201909h, and 201916h (1990).

An abstract of British published patent application 2 216 54 teaches that some alkyl esters of aliphatic or aromatic carboxylic acids, with an ester molecular weight over 250, are effective refrigerator working fluid lubricants, with solubility of at least 15% in tetrafluoroethane heat transfer fluid over the temperature range from $-40°$ to $80°$ C.

DESCRIPTION OF THE INVENTION

Except in the operating examples, or where otherwise expressly indicated, all numerical quantities in this description indicating amounts of material or conditions of reaction and/or use are to be understood as modified by the term "about" in defining the broadest scope of the invention. Practice of the invention within the boundaries corresponding to the exact quantities stated is preferable, however.

It has now been found that esters of polyols provide excellent lubricants and/or lubricant base stocks for use with fluoro-group-containing refrigerant heat transfer fluids, particularly chlorine-free fluorocarbon heat transfer fluids, provided that the esters contain a sufficient fraction of acyl groups with branched chains, i.e., groups containing at least one carbon atom that is bonded to at least three other carbon atoms by single bonds, and/or acyl groups with a total of from one to six, more preferably from one to five, carbon atoms. (For brevity hereinafter, these types of acyl groups are often denoted as "SaoB", an acronym for "Short and/or Branched". Most such esters suitable for use in the invention are known compounds per se, and may be prepared by known methods.) In order to provide satisfactory solubility, at least 22 number percent (hereinafter "no. %") of the acyl groups in the ester or ester mixtures that are lubricants and/or base stocks according to this invention will be of the SaoB type. With increasing preference in the order named, the no. % of such SaoB acyl groups would be at least 50, 67, 86, or, for low viscosity lubricants, 92.

Additionally and independently, for adequate solubility in highly fluorinated refrigerant heat transfer fluids, the ratio of the no. % of acyl groups in the ester(s) that contain 8 or more carbon atoms and are unbranched to the no. % of acyl groups in the ester(s) that are both branched and contain not more than six, preferably not more than five, carbon atoms will not be greater than 1.56, more preferably not greater than 1.21, or still more preferably not greater than 1.00. Also, additionally and independently, the no. % of acyl groups containing at least nine carbon atoms, whether branched or not, will not be greater than 81, or increasingly more preferably, not greater than 67 or 45.

For brevity, acids or acyl groups that contain 8 or more carbon atoms and are unbranched may be denoted hereinafter as "LU" (an acronym for "Long Unbranched"), while acids or acyl groups that are both branched and contain not more than six, preferably not more than five, carbon atoms may be denoted hereinafter as "SaB" (an acronym for "Short and Branched") and acids or acyl groups that contain at least nine carbon atoms, whether or not branched, may be denoted hereinafter as "L" (for long). The conditions on the amounts of the various classes of acyl groups in the ester(s) suitable for use in the invention may thus be stated mathematically as:

no. % of SaoB $\geq 22$;

no. % of L $\leq 81$; and (no. % of LU)/(no. % of SaB) $\leq 1.56$

It is preferred that at least 90 no. % of the acyl groups in all the esters used according to the invention have no more than twenty carbon atoms each. Saturated and unsaturated acyl groups may both be used, but saturated ones are preferred. Also, substituted as well as unsubstituted acyl groups may be used in esters according to the invention, but it is preferred that the acyl groups have no substituents other than alkoxy, fluoro, and/or chloro groups. Generally unsubstituted acyl groups are most economical and are most preferred for that reason.

For lubricants and/or base stocks according to the invention in the lower viscosity ranges, substantially all of the acyl groups in the esters are preferably monovalent ones. For higher viscosity ranges, some divalent acyl groups are preferred, as it is believed that esters containing two or more alcohol moieties joined by such divalent acyl groups, with all the other hydroxyl positions on the alcohols corresponding to the esterified by monoacyl groups, are particularly advantageous types of esters for use according to this invention. (An "alcohol moiety" in any ester is defined herein as a connected part of the ester that would remain if all acyl groups were removed from the ester. An acyl group may be denoted herein as an "acid moiety") in an ester.) If one or more of the acyl groups in an ester is divalent, the ester is denoted herein as a "complex ester"; such esters preferably include two alcohol moieties, which may be the same or different, but are both of the type already described below. Esters according to the invention with only one alcohol moiety and with all monovalent acyl groups may be denoted herein as "single polyol esters".

In order to promote the formation of complex esters containing two alcohol moieties where such esters are desired, it is preferred to react a single kind of alcohol (except for impurities) with a mixture of monovalent and divalent acids in such a ratio that the number of monovalent acids is at least sufficient to esterify all but one of the hydroxyl groups on each of the two desired alcohol molecules that are incorporated into the complex ester. Thus, e.g., if the alcohol moieties are predominantly pentaerythritol, one divalent acid moiety is sufficient to join two pentaerythritol moieties, while six monovalent acid moieties (acyl groups) are needed to esterify all the remaining hydroxyl groups in the two pentaerythritol molecules. For neopentyl glycol, the theoretically ideal molar ratio of monovalent to divalent acids would be 2:1, and for TMP it would be 4:1. The actual product, of course, is almost always a mixture of structures rather than a single complex ester.

Whether the acids used for esterification are all monovalent or contain some acids of higher valency, reaction between the alcohol(s) used and the acid(s) has been found to proceed more effectively if the quantity of acid charged to the reaction mixture initially is enough to provide an excess of 10–25 % of equivalents of acid over the equivalents of alcohol reacted with the acid. (An equivalent of acid is defined for the purposes of this specification as the amount containing one gram equivalent weight of carboxyl groups, while an equivalent of alcohol is the amount containing one gram equivalent weight of hydroxyl groups.) If the acid component reacted contains both monovalent and higher valent acids, the excess preferably is made up of monovalent acids alone.

In making most or all of the preferred esters according to this invention, the acid(s) reacted will be lower boiling than the alcohol(s) reacted and the product ester(s). When this condition obtains, it is preferred to remove the bulk of any excess acid remaining at the end of the esterification reaction by distillation, most preferably at a very low pressure such as 0.05 torr.

After such vacuum distillation, the product is often ready for use as a lubricant and/or base stock according to this invention. If further refinement of the product is desired, the content of free acid in the product after the first vacuum distillation may be further reduced by treatment with epoxy esters as taught in U.S. Pat. No. 3,485,754 or by neutralization with any suitable alkaline material such as lime, alkali metal hydroxide, or alkali metal carbonates. If treatment with epoxy esters is used, excess epoxy ester may be removed by a second distillation under very low pressure, while the products of reaction between the epoxy ester and residual acid may be left behind in the product without harm. If neutralization with alkali is used as the refinement method, subsequent washing with water, to remove any unreacted excess alkali and the small amount of soap formed from the excess fatty acid neutralized by the alkali, is strongly preferred before using the product as a lubricant and/or base stock according to this invention.

An independent constraint on the ratio between monovalent and higher valency acids to be reacted is that too large a fraction of acids with more than one valence may result in an undesirable amount of high molecular weight polymer, in view of the fact that all or substantially all of the alcohol(s) to be reacted also have at least two reactive groups. For this reason, it is increasingly preferred that the ratio of equivalents from monovalent acids to the equivalents from divalent or higher valent acids reacted be at least 1, 1.76, or 2.69. Also, the amount of acyl groups with a valence higher than 2 preferably is no more than 2 no. % of the total of all acyl groups.

It is preferred, with increasing preference in the order given, that at least 55, 67, 81, or 92 no. % of the divalent acyl groups in esters used according to this invention have from 4 to 12, or more preferably from 6–9 carbon atoms, and it is independently preferred, with increasing preference in the order given, that at least 55, 67, 81, or 92 % of the monovalent acyl groups in the esters contain no more than 18, more preferably no more than 9, still more preferably no more than 7, carbon atoms.

The esters suitable in this invention are esters of alcohols that contain at least 2, or more preferably at least 3, —OH groups in unesterified form. Independently, it is preferred, with increasing preference in the order given, that at least 62, 78, or 90 no. % of the alcohol moieties of the esters according to this invention contain no more than 18, more preferably no more than 10, still more preferably no more than 8, carbon atoms. Also independently, it is preferred, with increasing preference in the order given, that at least 62, 81, or 90 no. % of the alcohol moieties in the ester(s) contain at least one carbon atom bonded to four other carbon atoms by single bonds, or in other words, a "neo" carbon atom. The most preferred alcohol moieties for the esters are those derived from pentaerythritol, with the formula $C—(CH_2OH)_4$, from dipentaerythritol, with the formula $(HOCH_2)_3CCH_2OCH_2C(CH_2OH)_3$, and from 2,2-dimethylol-1-butanol (more commonly known as "1,1,1-trimethylolpropane" or "TMP"), with the formula $H_3CCH_2C(CH_2OH)_3$.

Unsaturated as well as saturated alcohols may be used for easters according to this invention, but saturated alcohols are preferred. Also, substituted alcohols as well as unsubstituted alcohols may be used, but it is preferred that the alcohols used have no substituents other than alkoxy groups, fluoro groups, and/or chloro groups. As with the acids or acyl groups to be used for esters according to this invention, generally unsubstituted alcohols are more economical and are most preferred for that reason.

A highly desirable constituent is the tetraester of pentaerythritol with iso- or i-pentanoic acid, which for purposes of this specification is defined as 2-methylbutanoic acid, 3-methylbutanoic acid, or any mixture of these two constituent. In one embodiment of the invention, it is preferred that this highly desirable constituent make up at least 14 no. % of the ester molecules.

Either pure esters or mixtures of esters meeting the above criteria may be effectively used in many embodiments of the invention. Generally mixtures of esters are more economical, because they may be prepared from commercially available starting materials without costly purification as a prerequisite. In one embodiment of the invention, mixtures of esters are preferred for performance reasons as well as economy: where moderate to high viscosity lubricants are needed, it is increasingly preferred that at least 12, at least 21, or at least 40 no. % of the acyl groups in the esters to be used for the invention contain at least 8, or more preferably at least 9, carbon atoms each.

Independently of all other preferences, it is increasingly more preferred that no more than 20, 14, 9, 5, and 2 no. % of the oxygen atoms in the esters to be used in a composition according to the invention be chemically bonded (as distinct from "hydrogen bonded") to a hydrogen atom.

Under some conditions of use, the ester(s) as described above will function satisfactorily as complete lubricants. It is generally preferable, however, for a complete lubricant to contain other materials generally denoted in the art as additives, such as oxidation resistance and thermal stability improvers, corrosion inhibitors, metal deactivators, lubricity additives, viscosity index improvers, pour and/or floc point depressants, detergents, dispersants, antifoaming agents, anti-wear agents, and extreme pressure resistant additives. Many additives are multifunctional. For example, certain additives may impart both anti-wear and extreme pressure resistance properties, or function both as a metal deactivator and a corrosion inhibitor. Cumulatively, all additives preferably do not exceed 8 % by weight, or more preferably do not exceed 5 % by weight, of the total lubricant formulation.

An effective amount of the foregoing additive types is generally in the range from 0.01 to 5 % for the antioxidant component, 0.01 to 5 % for the corrosion inhibitor component, from 0.001 to 0.5 % for the metal deactivator component, from 0.5 to 5 % for the lubricity additives, from 0.01 to 2 % for each of the viscosity index improvers and pour and/or floc point depressants, from 0.1 to 5 % for each of the detergents and dispersants, from 0.001 to 0.1 % for anti-foam agents, and from 0.1-2 % for each of the anti-wear and extreme pressure resistance components. All these percentages are by weight and are based on the total lubricant composition. It is to be understood that more or less than the stated amounts of additives may be more suitable to particular circumstances, and that a single molecular type or a mixture of types may be used for each type of additive component. Also, the examples listed below are intended to be merely illustrative and not limiting.

Examples of suitable oxidation resistance and thermal stability improvers are diphenyl-, dinaphthyl-, and phenyl-naphthyl-amines, in which the phenyl and naphthyl groups can be substituted, e.g., N,N'-diphenyl phenylenediamine, p-octyldiphenylamine, p,p-dioctyldiphenylamine, N-phenyl-1-naphthyl amine, N-phenyl-2-naphthyl amine, N-(p-dodecyl)-phenyl-2-naphthyl amine, di-1-naphthylamine, and di-2-naphthylamine; phenothazines such as N-alkylphenothiazines; imino(-bisbenzyl); and hindered phenols such as 6-(t-butyl) phenol, 2,6-di-(t-butyl) phenol, 4-methyl-2,6-di-(t-butyl) phenol, 4,4'-methylenebis(-2,6-di-{t-butyl} phenol), and the like.

Examples of suitable cuprous metal deactivators are imidazole, benzamidazole, 2-mercaptobenzthiazole, 2,5-dimercaptothiadiazole, salicylidine-propylenediamine, pyrazole, benzotriazole, tolutriazole, 2-methylbenzamidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleylsarcosine, sorbitan monooleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkylammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index improvers include polymethacrylates, copolymers of vinyl pyrrolidone and methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives; and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable anti-foam agents include silicone polymers and some acrylates.

Examples of suitable anti-wear and extreme pressure resistance agents include sulfurized fatty acids and fatty acid esters, such as sulfurized octyl tallate; sulfurized terpenes; sulfurized olefins; organopolysulfides; organo phosphorus derivatives including amine phosphates, alkyl acid phosphates, dialkyl phosphates, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons, and xanthates.

Under some conditions of operation, it is believed that the presence in lubricants of the types of polyether polyols that have been prominent constituents of most prior art lubricant base stocks taught as useful with fluorocarbon refrigerant working fluids are less than optimally stable and/or inadequately compatible with some of the most useful lubricant additives. Thus, in one embodiment of this invention, it is preferred that the lubricant base stocks and lubricants by substantially free of such polyether polyols. By "substantially free", it is meant that the compositions contain no more than about 10% by weight, preferably no more than about 2.6% by weight, and more preferably no more than about 1.2% by weight of the materials noted.

Another embodiment of the present invention is a refrigerant working fluid comprising both a suitable heat transfer fluid such as a fluorocarbon or chlorofluorocarbon and a lubricant according to this invention. Preferably, the two necessary components should have chemical characteristics and be present in such a proportion to each other that the working fluid remains homogeneous, i.e., free from visually detectable phase separations or turbidity, over the entire range of working temperatures to which the working fluid is exposed during operation of a refrigeration system in which the working fluid is used. This working range may vary from −60° C. to as much as +175° C. It is often adequate if the working fluid remains single phase up to +30° C., although it is increasingly more preferable if the single phase behavior is maintained up to 40, 56, 71, 88°, or 100° C. Similarly, it is often adequate if the working fluid compositions remains a single phase when chilled to 0° C., although it is increasingly more preferable if the single phase behavior persists to −10, −20, −30, −40°,or −55° C. Single phase mixtures with chlorine free hydrofluorocarbon refrigerant working fluids can often be obtained with the suitable and preferred types of esters described above, with the most preferred esters most likely to give such single phase behavior over a wide temperature range.

Inasmuch as it is often difficult to predict exactly how much lubricant will be mixed with the heat transfer fluid to form a working fluid, it is most preferable if the lubricant composition forms a single phase in all proportions with the heat transfer fluid over the temperature ranges noted above. This however, is a very stringent requirement, and it is often sufficient if there is single phase behavior over the entire temperature range for a working fluid mixture containing up to 1% by weight of lubricant according to this invention. Single phase behavior over a temperature range for mixtures containing up to 2, 4, 10, and 15 % by weight of lubricant is successively more preferable.

In some cases, single phase behavior is not required. The term "miscible" is used in the refrigeration lubrication art and in this description when two phases are formed but are readily capable of being mixed into a uniform dispersion that remains stable as long as it is at least moderately agitated mechanically. Some refrigeration (and other) compressors are designed to operate satisfactorily with such miscible mixtures of refrigerant working fluid and lubricant. In contrast, mixtures that lead to coagulation or significant thickening and form two or more phases are unacceptable commercially and are designated herein as "immiscible". Any such mixture described below is a comparative example and not an embodiment of the present invention.

The ranges and preferred ranges of viscosity and variation of viscosity with temperature for lubricant compositions according to this invention are generally the same as established in the art for lubricants to be used in refrigeration systems together with a heat transfer fluid, particularly a fluorocarbon and/or chlorofluorocarbon heat transfer fluid. In general, it is preferred that lubricants according to this invention have International Organization for Standardization ("ISO") viscosity grade numbers between 22 and 220, or more preferably between 32 and 100. The viscosity ranges for the ISO viscosity grade numbers are given in Table 1.

The practice of the invention may be further understood and appreciated by consideration of the following examples and comparative examples.

GENERAL ESTER SYNTHESIS PROCEDURE

The alcohol(s) and acid(s) to be reacted, together with a suitable catalyst such as dibutyltin diacetate, tin oxalate, phosphoric acid, and/or tetrabutyl titanate, are charged into a round bottomed flask equipped with a stirrer, thermometer, nitrogen sparging means, condenser, and a recycle trap. Acid(s) were charged in about a 15% molar excess over the alcohol(s). The amount of catalyst was from 0.02 to 0.1% by weight of the weight of the total

TABLE 1

| ISO Viscosity Grade Number | Viscosity Range in Centistokes at 40° C. | |
|---|---|---|
| | Minimum | Maximum |
| 2 | 1.98 | 2.42 |
| 3 | 2.88 | 3.52 |
| 5 | 4.14 | 5.06 |
| 7 | 6.12 | 7.48 |
| 10 | 9.00 | 11.0 |
| 15 | 13.5 | 16.5 |
| 22 | 19.8 | 24.2 |
| 32 | 28.8 | 35.2 |
| 46 | 41.4 | 50.6 |
| 68 | 61.2 | 74.8 |
| 100 | 90.0 | 110 |
| 150 | 135 | 165 |
| 220 | 198 | 242 |
| 320 | 288 | 352 |
| 460 | 414 | 506 |
| 680 | 612 | 748 |
| 1,000 | 900 | 1,100 |
| 1,500 | 1,350 | 1,650 | acid(s) and alcohol(s) reacted.

acids(s) and alcohol(s) reacted.

The reaction mixture was heated to a temperature between about 220° and 230° C., and water from the resulting reaction was collected in the trap while refluxing acids were returned to the reaction mixture. Partial vacuum was maintained above the reaction mixture as necessary to achieve a reflux rate of between 8 and 12% of the original reaction mixture volume per hour.

The reaction mixture was sampled occasionally for determination of hydroxyl number, and after the hydroxyl number had fallen below 15.0 mg of KOH per gram of mixture for reactions including divalent acid, or below 5.0 mg of KOH per gram of mixture for other reactions, the majority of the excess acid was removed by distillation after applying the highest vacuum obtainable with the apparatus used, corresponding to a residual pressure of about 0.05 torr, while maintaining the reaction temperature. The reaction mixture was then cooled, and any residual acidity was removed, if desired, by treatment with lime, sodium hydroxide, or epoxy esters. The resulting lubricant or lubricant base stock was dried and filtered before phase compatibility testing.

GENERAL PROCEDURE FOR PHASE COMPATIBILITY TESTING

One milliliter ("ml") of the lubricant to be tested is placed into a thermal shock resistant, volumetrically graduated glass test tube 17 millimeters ("mm") in diameter and 145 mm long. The test tube is then stoppered and placed into a cooling bath regulated to −29±0.2 C. After the tube and contents have equilibrated in the cooling bath for 5 minutes ("min"), sufficient refrigerant working fluid is added to give a total volume of 10 ml.

At least 15 min after the working fluid has been added, during which time the tube and contents have been equilibrating in the cooling bath and the contents may have been agitated if desired, the tube contents are visually examined for evidence of phase separation. If there is any such phase separation, the tube is shaken to determine whether the combination can be rated as miscible or is totally unacceptable.

If there is no evidence of phase separation at −29° C., the temperature of the cooling bath is usually lowered at a rate of 0.3. per min until phase separation is observed. The temperature of first observation of phase separation, if within the range of the cooling equipment used, is then noted as the insolubility onset temperature.

Results of compatibility testing of several esters and ester mixtures with Refrigerant 134a are shown in Tables 2-5 following. In these tables, all percentages are by weight unless otherwise stated.

TABLE 2

VARIATION OF ACID(S) USED IN SINGLE POLYOL ESTERS

| Acid(s) | | Phase Compatibility at −29° C. | Insolubility Onset Temperature, °C. |
|---|---|---|---|
| 65% n-C$_5$ 35% i-C$_5$ | + | Soluble | <−55 |
| n-C$_5$ | | Soluble | −37 |
| i-C$_7$ | | ½ Soluble + ½ Miscible | |
| n-C$_7$ | | Miscible | |
| i-C$_9$ | | Immiscible | |
| n-C$_9$ | | Immiscible | |
| 60% n-C$_8$ 40% n-C$_{10}$ | + | Immiscible | |
| 17% i-C$_5$ 33% n-C$_5$ 50% n-C$_7$ | + + | Soluble | −37 |
| 17% i-C$_5$ 33% n-C$_5$ 50% i-C$_9$ | + + | Soluble | <−55 |
| 17% i-C$_5$ 33% n-C$_5$ 50% n-C$_9$ | + + | Immiscible | |
| 17% i-C$_5$ 33% n-C$_5$ 30% n-C$_8$ 20% n-C$_{10}$ | + + + | Immiscible | |

Notes for Table 2
i-C$_5$ = an approximately equimolar mixture of 2-methyl butanoic acid and 3-methyl butanoic acid; n-C$_5$ = >90% pentanoic acid; i-C$_7$ = (about 65% 2-methyl hexanoic acid + about 20% 2-ethyl pentanoic acid + about 10% heptanoic acid + a balance of other C$_7$ acids); n-C$_7$ = >90% heptanoic acid; i-C$_9$ = >90% 3,5,5-trimethyl hexanoic acid; n-C$_9$ = >90% nonanoic acid; n-C$_8$ = >90% octanoic acid; n-C$_{10}$ = >90% decanoic acid. For all the esters in this table, the alcohol moieties were derived from a mixture of 85% pentaerythritol and 15% dipentaerythritol.

TABLE 3

LUBRICANTS OR LUBRICANT BASE STOCKS INCLUDING DIVALENT ACID MOIETIES

| Polyol Used | | Dibasic Acid Used | Phase Compatibility Test Result at −29° C. |
|---|---|---|---|
| PE | | Adipic | Soluble |
| 85% PE 15% DPE | + | Adipic | Soluble |
| TMP | | Adipic | Miscible |
| PE | | Azelaic | Miscible |

Notes for Table 3
Esters were synthesized from a mixture with an equivalents ratio of 1.00:0.25:0.75 for polyol(s):dibasic acid:monobasic acids. The monobasic acids in each case were a mixture of about 65% pentanoic and 17.5% each of 3-methyl butanoic and 2-methyl butanoic acids. The compatibility tests in these instances were not extended below −29° C. PE = pentaerythritol; DPE = dipentaerythritol; TMP = 2,2-dimethylol-1-butanol; all alcohols were >95% pure.

TABLE 4

VARIATION OF ALCOHOL(S) USED

| Alcohol(s) | | Phase Compatibility at −29° C. | Insolubility Onset Temperature, °C. |
|---|---|---|---|
| 85% PE 15% DPE | + | Soluble | <−55 |
| DPE | | Soluble | <−55 |
| TMP | | Soluble | <−55 |

Notes for Table 4
PE = pentaerythritol; DPE = dipentaerythritol; TMP = 2,2-dimethylol-1-butanol; all alcohols were >95% pure. Commercial "Iso C$_5$" acid, which is a mixture of about 65% pentanoic acid + 17.5% each of 2-methylbutanoic acid and 3-methylbutanoic acid, was the acid used.

TABLE 5

EXAMPLES OF SUITABLE LUBRICANTS INCLUDING ADDITIVES

| | Additive | |
|---|---|---|
| Trade Name | Chemical and Functional Characterization | Amount, % of Esters |
| Irganox ™ L-109 | phenolic antioxidant | 0.5 |
| Irganox ™ L-57 | amine antioxidant | 0.5 |
| Irganox ™ L-115 | sulfur-containing phenolic antioxidant | 0.5 |
| Vanlube ™ 7723 | dithiocarbamate antioxidant and extreme pressure agent | 0.5 |
| Emery ™ 9844 | sulfurized ester friction modifier | 0.5 |
| Syn O Ad ™ 8478 | triarylphosphate ester anti-wear agent | 0.5 |
| Irgalube ™ 349 | amine phosphate anti-wear agent and rust inhibitor | 0.1 |
| Reocor ™ 12 | alkenyl succinic acid derivative rust inhibitor | 0.1 |
| Cobratec ™ 99 | benzotriazole copper corrosion inhibitor | 0.1 |
| Reomet ™ 39 | triazole derivative copper corrosion inhibitor | 0.1 |

Notes for Table 5
For all examples in this table, the base stock was a mixture of esters of (13% 3-methyl butanoic acid + 13% 2-methyl butanoic acid + 49% pentanoic acid + 25% 3,5,5-trimethyl hexanoic acid) with (85% pentaerythritol + 15% dipentaerythritol). All the mixtures shown in this table were fully soluble in the phase compatibility test with Refrigerant 134 a at −40° C.; in this case, the tests were not extended to lower temperatures.

What is claimed is:

1. A refrigerant working fluid comprising:
(A) a fluoro-group-containing heat transfer fluid; and
(B) a lubricant composition consisting essentially of materials selected from the group consisting of esters of (i) alcohols containing at least two —OH groups and (ii) organic carboxylic acids, wherein:
(a) at least about 22 number percent of the acyl groups in the total of all the esters in said lubricant composition include no more than six carbon atoms, or include at least one carbon atom bonded to at least three other carbon atoms by single bonds, or both;

(b) the ratio of the number percent of acyl groups in the total of all the esters in said lubricant composition that are that contain 8 or more carbon atoms and are unbranched to the number percent of acyl groups in the total of all the esters in said lubricant composition that are both branched and contain not more than 6 carbon atoms is not greater than about 1.56;

(c) the number percent of acyl groups in the total of all the esters in said lubricant composition that contain nine or more carbon atoms is not greater than about 81; and (d) at least 62 number percent of the total of all the alcohol moieties in the esters in said lubricant composition contain at least one carbon atom that is bonded by carbon-carbon single bonds to four other carbon atoms.

2. A refrigerant working fluid according to claim 1, wherein:
(a) at least 81 number percent of the total of all the alcohol moieties in the esters in said lubricant composition contain at least one carbon atom that is bonded by carbon-carbon single bonds to four other carbon atoms;
(b) the ratio of the number of monovalent acyl groups to the number of acyl groups with more than one valence in the total of all the esters in said lubricant composition is at least 1.76; and
(c) the number percent of acyl groups containing at least nine carbon atoms in the total of all the esters in said lubricant composition is not greater than 67.

3. A refrigerant working fluid according to claim 2, wherein:
(a) at least 81 number percent of the total of all the alcohol moieties in the esters in said lubricant composition are moieties derived from the group consisting of pentaerythritol, dipentaerythritol, and 2,2-dimethylol-1butanol;
(b) the ratio of the number of monovalent acyl groups to the number of divalent acyl groups in said lubricant composition is at least about 4, and there is not more than 2 number percent of acyl groups with a valence higher than 2;
(c) the number percent of acyl groups containing at least nine carbon atoms in the total of all the esters in said lubricant composition is not greater than 45; and
(d) the number percent of total oxygen atoms in the total of all the esters in said lubricant composition that are chemically bonded to hydrogen is not greater than 5.

4. A refrigerant working fluid according to claim 1, wherein:
(A) at least 22 number percent of the total number of acyl groups in all the esters of all alcohols containing at least two —OH groups present in the lubricant composition are selected from the group consisting of (i) acyl groups containing no more than 5 carbon atoms and (ii) acyl groups containing at least one carbon atom bonded to at least three other carbon atoms by single bonds; and
(B) at least 12 number percent of the acyl groups in the esters of all alcohols containing at least two —OH groups present in the lubricant composition contain at least 8 carbon atoms each.

5. A refrigerant working fluid according to claim 4, wherein:

(A) at least 50 number percent of total number of acyl groups in all the esters of all alcohols containing at least two —OH groups present in the lubricant composition are selected from the group consisting of (i) acyl groups containing no more than 5 carbon atoms and (ii) acyl groups containing at least one carbon atom bonded to at least three other carbon atoms by single bonds;
(B) at least 21 number percent of the acyl groups in the esters of all alcohols containing at least two —OH groups present in the lubricant composition contain at least 9 carbon atoms each; and
(C) at least 81 number percent of all the alcohol moieties in the esters of all alcohols containing at least two —OH groups present in the composition are moieties derived from alcohols that contain at least one carbon atom bonded to four other carbon atoms by carbon-carbon single bonds.

6. A refrigerant working fluid according to claim 5, wherein:
(A) at least 14 number percent of total number of acyl groups in all the esters of all alcohols containing at least two —OH groups present in the lubricant composition are selected from 3-methyl butanoyl and 2-methyl butanoyl groups; and
(B) at least 81 number percent of all the alcohol moieties in the esters of all alcohols containing at least two —OH groups present in the lubricant composition are moieties derived from alcohols selected from the group consisting of pentaerythritol, dipentaerythritol, and 2,2-dimethylol-1-butanol.

7. A refrigerant working fluid according to claim 6, wherein said fluoro-group-containing heat transfer fluid is chlorine-free.

8. A refrigerant working fluid according to claim 5, wherein said fluoro-group-containing heat transfer fluid is chlorine-free.

9. A refrigerant working fluid according to claim 4, wherein said fluoro-group-containing heat transfer fluid is chlorine-free.

10. A refrigerant working fluid according to claim 3, wherein said fluoro-group-containing heat transfer fluid is chlorine-free.

11. A refrigerant working fluid according to claim 2, wherein said fluoro-group-containing heat transfer fluid is chlorine-free.

12. A refrigerant working fluid according to claim 1, wherein said fluoro-group-containing heat transfer fluid is chlorine-free.

13. A refrigerant working fluid according to claim 1, which has only a single phase at equilibrium over a temperature range from about −40° C. to about 100° C.

14. A process for operating a mechanical refrigerating system comprising cyclic compression, liquefaction, expansion, and evaporation of a fluoro-group-containing heat transfer fluid, wherein the improvement comprises lubricating a part of the refrigerating system that comes into contact with the heat transfer fluid with a lubricant composition consisting essentially of materials selected from the group consisting of esters of (i) alcohols containing at least two —OH groups and (ii) organic carboxylic acids, wherein:
(A) at least about 22 number percent of the acyl groups in the total of all the esters in said lubricant composition include no more than six carbon atoms, or include at least one carbon atom bonded to at least three other carbon atoms by single bonds, or both;

(B) the ratio of the number percent of acyl groups in the total of all the esters in said lubricant composition that contain 8 or more carbon atoms and are unbranched to the number percent of acyl groups in the total of all the esters in said lubricant composition that are both branched and contain not more than six carbon is not greater than about 1.56;

(C) the number percent of acyl groups in the total of all the esters in said lubricant composition that contain nine or more carbon atoms is not greater than about 81; and at least 62 number percent of the total of all the alcohol moieties in the esters in said lubricant composition contain at least one carbon atom that is bonded by carbon-carbon single bonds to four carbon atoms.

15. A process according to claim 14, wherein in said lubricant composition:
(a) at least 81 number percent of the total of all the alcohol moieties in the esters in said primary lubricant component contain at least one carbon atom that is bonded by carbon-carbon single bonds to four other carbon atoms;
(b) the ratio of the number of monovalent acyl groups to the number of acyl groups with more than one valence in the total of all the esters in said primary lubricant component is at least 1.76; and
(c) the number percent of acyl groups containing at least nine carbon atoms in the total of all the esters in said primary lubricant component is not greater than about 67.

16. A process according to claim 15, wherein in said lubricant composition:
(a) at least about 81 number percent of the total of all the alcohol moieties in the esters in said primary lubricant component are moieties derived from the group consisting of pentaerythritol, dipentaerythritol, and 2,2-dimethylol-1-butanol;
(b) the ratio of the number of monovalent acyl groups to the number of divalent acyl groups in said primary lubricant component is at least about 4, and there is not more than 2 number percent of acyl groups with a valence higher than 2;
(c) the number percent of acyl groups containing at least nine carbon atoms in the total of all the esters in said primary lubricant component is not greater than 45; and
(d) the number percent of total oxygen atoms in the total of all the esters in said primary lubricant component that are chemically bonded to hydrogen is not greater than 5.

17. A process according to claim 14, wherein said lubricant composition comprises at least two esters that are esters of an alcohol containing at least two —OH groups, and:
(A) at least 22 number percent of total number of acyl groups in all the esters of all alcohols containing at least two —OH groups present in said lubricant composition are selected from the group consisting of (i) acyl groups containing no more than 5 carbon atoms and (ii) acyl groups containing at least one carbon atom bonded to at least three other carbon atoms by single bonds; and
(B) at least 12 number percent of the acyl groups in the esters of all alcohols containing at least two —OH groups present in said lubricant composition contain at least 8 carbon atoms each.

18. A process according to claim 17, wherein:
(A) at least 50 number percent of total number of acyl groups in all the esters of all alcohols containing at least two —OH groups present in said lubricant composition are selected from the group consisting of (i) acyl groups containing no more than 5 carbon atoms and (ii) acyl groups containing at least one carbon atom bonded to at least three other carbon atoms by single bonds;
(B) at least 21 number percent of the acyl groups in the esters of all alcohols containing at least two —OH groups present in said lubricant composition contain at least 9 carbon atoms each; and
(C) at least 81 number percent of all the alcohol moieties in the esters of all alcohols containing at least two —OH groups present in said lubricant composition are moieties derived from alcohols that contain at least one carbon atom bonded to four other carbon atoms by carbon-carbon single bonds.

19. A process according to claim 18, wherein:
(A) at least 14 number percent of total number of acyl groups in all the esters of all alcohols containing at least two —OH groups present in said lubricant composition are selected from 3-methyl butanoyl and 2-methyl butanoyl groups; and
(B) at least 81 number percent of all the alcohol moieties in the esters of all alcohols containing at least two —OH groups present in said lubricant composition are moieties derived from alcohols selected from the group consisting of pentaerythritol, dipentaerythritol, and 2,2-dimethylol-1-butanol.

20. A process according to claim 14, wherein no more than 9 number percent of the oxygen atoms in the total of all the esters in said lubricant composition are chemically bonded to hydrogen atoms.

* * * * *

Adverse Decision In Interference

Patent No. 5,021,179, Eugene R. Zehler, Nicholas Schnur, LUBRICATION FOR REFRIGERANT HEAT TRANSFER FLUIDS, Interference No. 103,526, final judgment adverse to the patentees rendered June 14, 2001, as to claims 1-20.

*(Official Gazette April 1, 2003)*